No. 686,078. Patented Nov. 5, 1901.
A. JOHNSON.
SCREW DRIVER.
(Application filed Apr. 3, 1901.)
(No Model.)
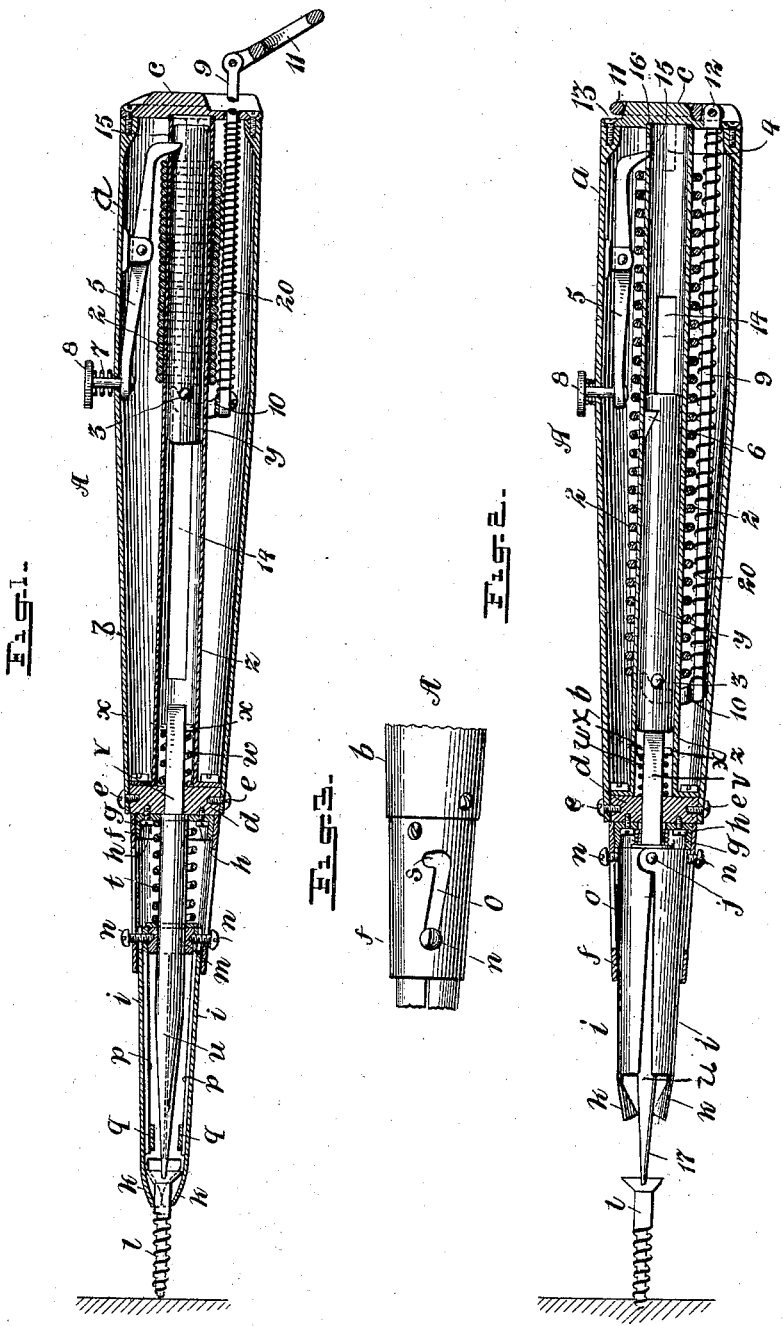
WITNESSES:
Geo. W. Naylor.
C. Sedgwick
INVENTOR
Axel Johnson
BY
A. O. Thayer,
ATTORNEY

UNITED STATES PATENT OFFICE.

AXEL JOHNSON, OF NEW BRITAIN, CONNECTICUT.

SCREW-DRIVER.

SPECIFICATION forming part of Letters Patent No. 686,078, dated November 5, 1901.

Application filed April 3, 1901. Serial No. 54,159. (No model.)

*To all whom it may concern:*

Be it known that I, AXEL JOHNSON, a subject of the King of Sweden and Norway, and a resident of New Britain, Hartford county, State of Connecticut, have invented certain new and useful Improvements in Screw-Drivers, of which the following is a specification.

The objects of my invention are to provide an improved screw-holding attachment for screw-drivers, whereby the screws may be quickly placed in the holder and be thereby conveniently set in the place for driving, particularly in an upward position, and means for automatically thrusting the screw by a blow delivered on the screw-driver to set the point of the screw into the wood for starting the screw in cutting its way thereafter as the screw-driver is turned, as hereinafter described, reference being made to the accompanying drawings, in which—

Figure 1 is a longitudinal sectional elevation of my improved screw-driver with a screw held in it with the point at the place where it is to be driven and with the striker set ready for delivering the blow to set the point into the wood. Fig. 2 is a similar section showing the parts of the apparatus after the thrust on the screw for setting in the point and when in condition for driving it by rotatory action. Fig. 3 is a detached part in side elevation.

A represents a tubular metallic handle which is preferably constructed in a cylindrical part $a$ and a taper part $b$. The open end of part $a$ is provided with a detachable cover $c$, and the open end of taper part $b$ is closed by a plug $d$, secured by radially-inserted screws $e$. A taper tubular extension $f$ of the handle is attached by a collar $g$ and screws $h$ to the end of taper part $b$ of said handle being screwed onto the face of plug $d$. Within this tubular extension $f$ a pair of semitubular and taper screw-holding fingers $i$ are arranged, said fingers being longer than extension $f$ and pivoted together at $j$ near the upper ends and having the contracted and notched lower ends $k$ adapted to grip and hold the head of a screw $l$, as represented in Fig. 1, when the jaws are thrust outward of the part $f$. Inside of the upper ends of the fingers is a collar $m$, to which the fingers are confined by screws $n$, said screws being inserted thereinto through slits $o$ of the extension $f$, wherein the screws $n$ slide freely to allow the fingers to shift out and in said extension within certain limits, and there is also a flat spring $p$ inside of each finger, secured at one end between the finger and the collar $m$ by one of the screws $n$, said springs extending nearly the whole length of the finger and confined against the inside of the finger, the purpose of said springs being to hold the fingers closed for holding the screws by the heads when placed in the fingers. These springs yield to pressure tending to open the fingers when the screws are to be put in, and they also yield to the wedging action of the screw-heads when after starting the screws in the wood the fingers are pulled backward relatively to the screws, as represented in Fig. 2.

The means herein represented for confining the springs $p$ near the outer end of the fingers consist of a short thin strap $q$ to each spring, placed crosswise of it and fastened in any way to the finger each side of the spring, as by a rivet; but no particular form is preferred, only the confinement of the springs should be such that slight lengthwise movement of the spring and finger may be permitted relatively to each other to prevent binding, in consequence of their axes being slightly eccentric to each other.

The fingers $i$ can be drawn backward within the extension $f$ the length of the slots $o$ and be secured in that position by lodging the stud-screws $n$ in the lateral notches $s$, provided for that purpose at the upper ends of the slots. A coiled spring $t$, located in extension $f$ between plug $d$ and collar $m$, tends to thrust the fingers out when the stud-screws $n$ are released from said notches $s$, which is effected by a slight lateral thrust by the fingers of the operator on the heads of the stud-screws, and it is by the stud-screws that the fingers $i$ are pulled back. This movement of the fingers compresses the spring and sets it in tension for thrusting out the fingers again when the spring is released by disengaging the stud-screws $n$ from the notches $s$. When the fingers are thrust out by the spring, the larger upper end portions of the fingers wedge into the smaller taper end portion of the extension $f$, and thus reinforce the springs p to grip and hold the screws, but the fingers may be readily opened against these two forces for putting in the screws to be driven.

A screw-driving blade u is located in the longitudinal axis of the handle and the fingers reaching from a suitable distance above the plug d into the jaws of the screw-gripping fingers when they are extended. It is mounted in its position in central perforations of the plug d and the collar m and is slidable in them. The perforation of the plug d is of an angular cross-section, and the part v of the shank of the blade working therein is of corresponding form for transmitting the rotatory motion of the handle to the driving-blade. With the exception of the angular part v the rest of the shank of the blade u is preferably round, and the spring t between plug d and collar m is placed on and is guided by it. The part v enters the main part of the handle A a short distance and has a coiled spring w placed on it between plug d and stud-pins x, said spring being under tension to retract the blade after delivering a blow on the screw.

Between the upper end of the shank of the screw-driving blade a plunger y is arranged in a guideway z, so as to be forcibly thrust against said end of the shank by a spiral spring 2, coiled around the guideway z between stud-pins 3 of the plunger and stop 4 near the upper end of the handle, between which the spring is compressed when the plunger is retracted, as in Fig. 1, and is set by the tripping-pawl 5 preparatory to delivering the blow. The pawl automatically engages a notch 6 in the plunger through the action of the spring 7 and stud 8 when the plunger is retracted. The retraction is effected by the rod 9 reaching into the handle A through the cover and armed with a crotch-hook 10, that engages the studs 3, said rod having a ring 11 pivoted to its outer end at 12 for convenience in pulling up the spring. The ring lodges in an annular recess 13 in the outside of the cover of the handle when not in use, and it may have any approved means of returning it while not required for use. A coiled spring 20 on rod 9 returns the retractor after setting the plunger and keeps it from sliding outward while spring 2 is contracted.

The guideway z for the plunger y consists of a tube centered at its ends on the plug d and the cover, respectively, and attached in any suitable way to the plug. The other end enters a slight recess 16 in the cover and is also confined between the two stop-lugs 4 of the cover, against which the end of the plunger-thrusting spring bears. The principal function of these stop-lugs is, however, to stop the spring back clear of the bit of the tripping-pawl.

The plunger-guiding tube is slotted at 14 for the stud-pins 3 and is notched at 15 for the bit of the tripper-pawl.

It will be seen that with this improved tool screws may be held with great facility for setting with the screw-driver with or without the impulse of the plunger and that it is especially serviceable in setting the screws in positions that have to be reached upwardly and requiring the screws to be started with a blow. When the blow has been struck and the screw started, the fingers, being no longer required for holding the screw, are pulled back and locked in the retracted position by engaging the stud-screws n in the notches s. In this operation the mouth of extension f affords space for the taper fingers to open, so as to retract along the taper part 17 of the blade u and leave it free for completing the driving of the screw.

The plunger y is tripped for striking the blow by pressing the stud 8 when the screw is in position to be set in.

What I claim as my invention is—

1. The combination with the handle and its taper tubular and slotted extension, of the semitubular taper fingers having jaws at one end adapted for gripping the head of a screw and jointed together at the other end within said extension, the axially-perforated collar centered in the jointed ends of the fingers, stud-pins connecting with the collar through the slots of the handle extension, the screw-driver blade mounted in the collar and the end of the handle, and the spiral spring between said collar and said end of the handle, said collar and fingers being arranged to slide in the extension, and the slots of the latter having the lateral notches for locking the collar by the stud-screws.

2. The combination with the handle and its taper tubular and slotted extension, of the semitubular taper fingers having jaws at one end adapted for gripping the head of a screw and jointed together at the other end within said extension, the axially-perforated collar centered in the jointed ends of the fingers, stud-pins connecting with the collar through the slots of the handle extension, the finger-closing springs secured between the fingers and the collar by the stud-screws, and at their outer extremities connected with the fingers for closing them, the screw-driver blade mounted in the collar and the end of the handle, and the spiral spring between said collar and said end of the handle, said collar and fingers being arranged to slide in the extension and the slots of the latter having the lateral notches for locking the collar by the stud-screws.

3. The combination with the tubular handle, taper tubular extension of said handle, the axially-perforated collar slidable in said extension, screw-holding fingers jointed to said collar, the screw-driving blade mounted in the collar and the end of the handle and slidable therein, spiral spring between said collar and said head, means for retracting the fingers and locking them in the retracted position, the plunger and its operating spring for thrusting the blade, means for retracting, setting and tripping the plunger-thrusting spring and the blade-retracting spring.

4. The combination with the tubular handle, tubular extension of said handle, screw-gripping fingers slidable in said extension, and the screw-driving blade mounted slidably in said extension and fingers, and extending therefrom into the main handle, of the plunger arranged in a guideway in said handle coincident with the driving-blade, the spiral spring surrounding said guideway and connected with the plunger for driving it, retracting-spring for the driver, and means for contracting setting and tripping said plunger-driving spring.

Signed at New York city this 26th day of March, 1901.

AXEL JOHNSON.

Witnesses:
BERNARD F. GAFFNEY,
CECILIA T. CASSADY.